ATTITUDE INDICATOR

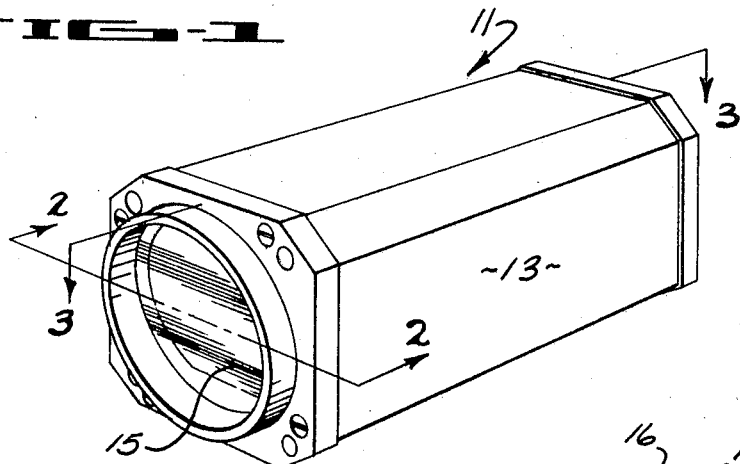
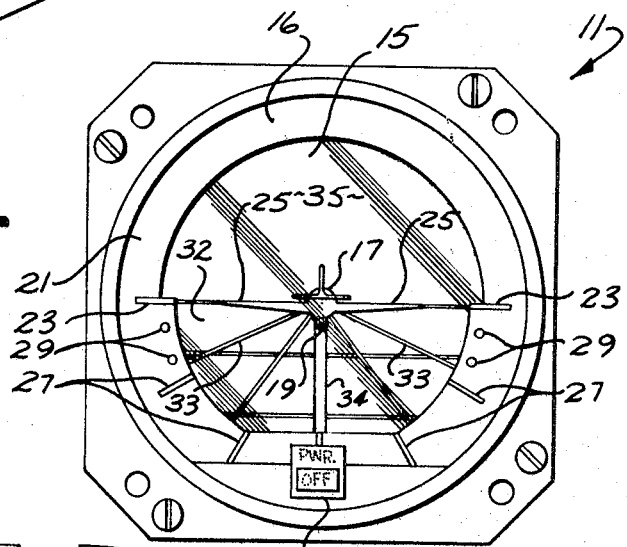
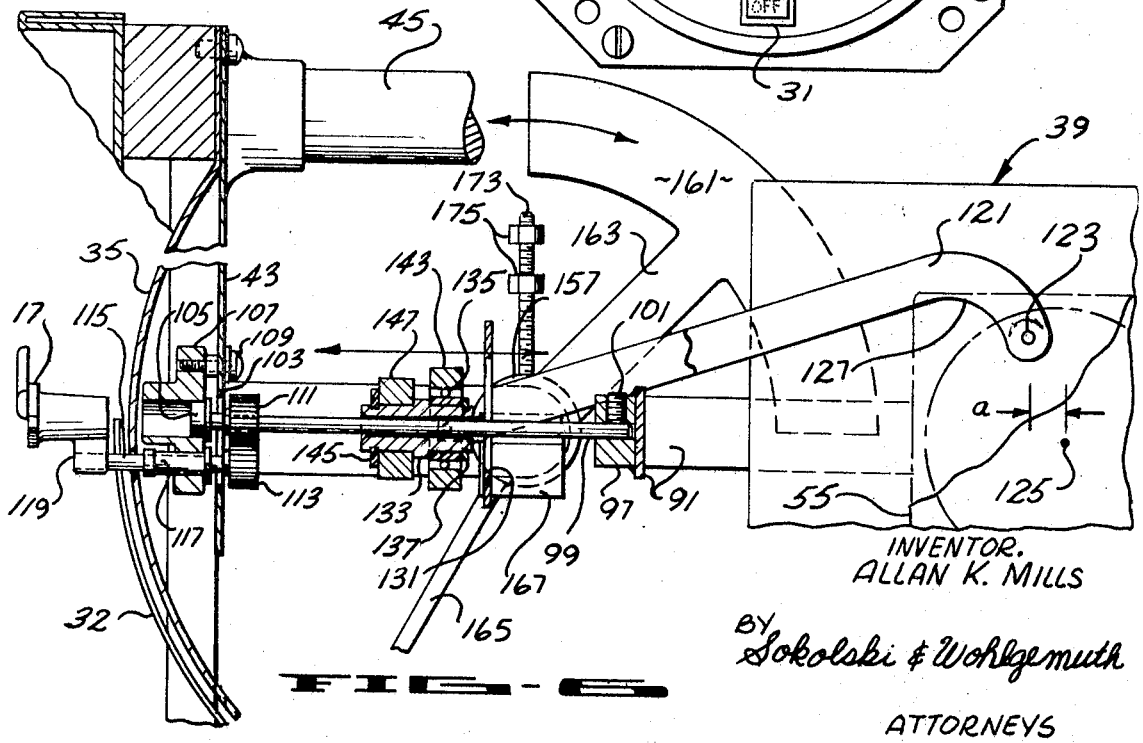
INVENTOR.
ALLAN K. MILLS
BY Sokolski & Wohlgemuth
ATTORNEYS Aug. 25, 1970     A. K. MILLS     3,525,159

Filed June 5, 1967     4 Sheets-Sheet 2

INVENTOR.
ALLAN K. MILLS

BY Sokolski & Wohlgemuth
ATTORNEYS

Aug. 25, 1970  A. K. MILLS  3,525,159
ATTITUDE INDICATOR
Filed June 5, 1967  4 Sheets-Sheet 3

INVENTOR.
ALLAN K. MILLS
BY
Sokolski & Wohlgemuth
ATTORNEYS

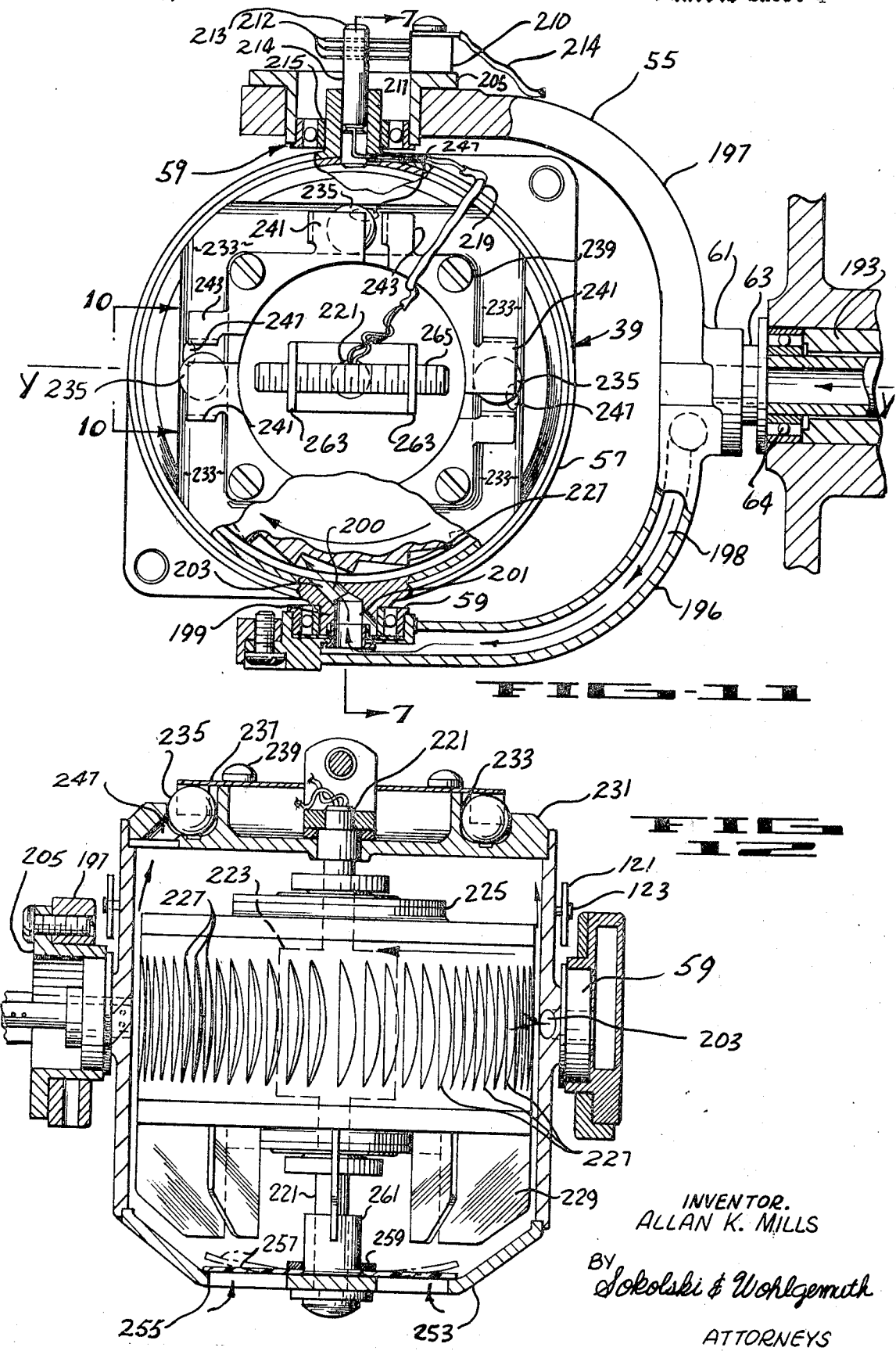

United States Patent Office

3,525,159
Patented Aug. 25, 1970

3,525,159
ATTITUDE INDICATOR
Allan K. Mills, Palos Verdes Peninsula, Calif., assignor to Brittain Industries Inc., Torrance, Calif., a corporation of California
Filed June 5, 1967, Ser. No. 643,488
Int. Cl. G01c *19/44, 19/52*
U.S. Cl. 33—204                1 Claim

ABSTRACT OF THE DISCLOSURE

An attitude indicator device utilizing an attitude gyro wherein a roll indicator symbol is driven directly by the outer gimbal in a reverse direction to the movement of the gimbal and the horizon reference is pivotally supported by bearings fixed at opposite sides of the housing for the device and rotatably driven by the inner gimbal through pairs of magnets. Additionally, an electro-pneumatic means is provided for redundancy and reliability to allow the use of both electric power and air pressure to operate the gyro. Four ports and balls located adjacent the ports provide means for erecting the gyro to vertical as air is directed out through the ports.

---

Attitude gyro indicator devices are well known and used throughout the airplane industry. This form of instrumentation provides the pilot with an artificial horizon to indicate the attitude of the airplane which is generally represented by a symbol on the face of the instrument. The devices serve to give an indication of the roll and pitch of the airplane. The prior art attitude gyro indicators utilized a movable mask which has a terrain depicted thereon, with a horizon drawn horizontally across the mask. The terrain could be represented by a grid pattern. In many instances, a simple line without the grid pattern has been utilized. The mask in these prior art devices is connected to both the inner and outer gimbals of a gyro that is normally vacuum driven. The airplane symbol is permanently affixed to the glass or covering in front of the terrain mask and thus rotates with the casing for the indicator. In these prior art devices, the terrain mask thus remains stationary in both roll and pitch relative to the earth due to the gyro effect, while the airplane symbol moves according to the movement of the plane. The prior devices are additionally concerned with tilt of the gyro mechanism due to various forces, such as can be encountered in normal flying. Thus, means are often provided for erecting and maintaining the gyro to a vertical position. This is often accomplished with air jets directed out of the gyro maintaining torque thereon to effect erection. These prior art methods are often not as accurate or as responsive as desired. Further, as indicated, most of the prior art gyro attitude indicators are vacuum driven using the vacuum system of the airplane, whereby air rushing into the gyro cavity drives impeller blades causing rotation of the gyro as a vacuum is drawn on the instrument by the vacuum system of the aircraft. If a failure in the vacuum system generally or in the particular line to the gyro occurs, it can be appreciated that the indicator will fail with often severe consequences in the ability to control the aircraft in poor weather. Alternatively, in gyros that are electrically driven the same problem can result if there is a failure in the electrical system of the aircraft.

The attitude gyro indicator of this invention overcomes the deficiencies of the prior art in providing several unique and novel features heretofore not found in this instrument. Firstly, the airplane indicator rotates in the roll direction about a pivot point in front of the terrain mask to give a true indication to the pilot of the actual movement of the airplane in the roll direction. This is much less confusing, especially to the novice pilot who previously encountered a movement of the horizon while being presented with the airplane in a fixed position at all times. It has always been misleading to the pilot to see the horizon move oppositely to the direction in which the airplane is tilting. In the indicator device of the herein invention, as will be described, the airplane symbol will now move in the roll direction in direct accord with the roll of the plane itself. In the pitch axis the mask moves according to movement of the inner gimbal to which it is rotatably connected. In addition to these features, the indicator device of the invention is provided with a novel electro-pneumatic arrangement for redundance and reliability. Thus, either electric power or air pressure can operate the gyro so that a failure in either system of the airplane will in no way affect the indicator device. The gyro device of the invention is normally operated in both the electric and pneumatic modes simultaneously. This provides a redundancy whereby a failure in either system is automatically compensated for without any switching or the like.

Finally, a novel arrangement is provided for erecting the gyro. As will be explained, a flapper valve assembly is situated on the bottom of the gyro so that air will be admitted when the rotor is electrically driven. This air is then ejected in the same manner as in a pneumatic mode of operation through four ports at the top of the gyro. The air is metered by four balls located on the flat top surface. The balls serve to uniquely control the air being ejected through the ports as the gyro is tilted. The end effect is that the balls always tend to keep the platform horizontal to the earth. This provides very responsive and accurate means for erecting the gyro when external conditions have caused it to tilt from its vertical axis.

Thus, the invention could be briefly described as an indicator device having a housing and a front transparent plate. Within the housing is situated the gyro mechanism. The gyro has both an outer and inner gimbal arrangement. The airplane symbol is pivotally connected to the housing so that it can rotate about a horizontal axis passing through its center, yet cannot move in any other direction. A gear is connected to the back of the symbol and engages a second gear which in turn is connected to the outer gimbal for the gyro. The gears are opposite gears so that the airplane symbol rotates oppositely from the direction of the gyro as will be explained. A terrain mask is disposed behind the airplane symbol and is connected to the inner gimbal, or effectively the body of the gyro. As a result, the horizon is always maintained fixed relative to the erected gyro. Thus, as the airplane rolls, the symbol moves in accord with the direction of roll of the airplane and will appear to roll on the indicator device relative to a horizontal horizon. Alternatively, when the airplane pitches the symbol which is affixed to the casing will move up and down relative to the horizon which is maintained in a constant position due to the erect gyro, and will indicate the degree of pitch above or below the horizon line.

As previously indicated, the gyro is provided with both electrical and pneumatic means for rotating it. When the gyro is operated in a pneumatic mode, a vacuum is created in the indicator case of the gyro, causing air to be sucked in through special ports into the gyro. The rotor gyro has air-buckets on its periphery. The air impinges on these buckets thus causing the rotor to spin. This air is then ejected out ports at the top of the gyro. In the electric mode, electricity is directed to a motor that rotates the gyro about its vertical axis. The air pressure is derived from a centrifugal fan on the rotor. A flapper valve is located on the bottom of the gyro and opens automatically when the pressure in the intake of this centrifugal fan is reduced as the fan spins up. Air is taken in through this valve and ejected out the ports at the top in the same manner as when the device is operated pneumatically. In the pneumatic mode a vacuum is created in the case, as indicated. This creates a positive pressure in the housing that overcomes the negative pressure caused by the fan inlet. The higher internal pressure causes the flapper valve to close and seal the housing of the gyro for proper pneumatic operation. The air ejected out of the ports at the top of the gyro is metered by four balls located on its flat surface which are maintained so as to allow only a small amount of travel. The balls are sensitive to gravity and will roll to their limit of travel as the gyro is tilted. The exhaust ports are located such that as the gimbal tilts in a given direction, one port is closed by the ball and the opposite port fully opened. The open port produces a thrust from the escaping air that is in the proper direction to cause a precession of the gimbal system opposite of the initial tilt. The effect of this is that the balls will always tend to keep their platform horizontal to the earth and thus the gyro is made perpendicular to the plane established by the balls. Thus it is always vertical to the earth's surface.

It is believed the invention will be better understood from the following detailed description and drawings in which:

FIG. 1 is a perspective view of the indicator device of the invention;

FIG. 2 is a front view of the gyro device of the invention taken along line 2—2 of FIG. 1;

FIG. 6 is a partially sectioned enlarged view of the mask and symbol actuating mechanism taken along lines 6—6 of FIG. 4;

FIG. 11 is a partially sectioned top view of the gyro mechanism taken along lines 11—11 of FIG. 4; and FIG. 12 is a partially sectioned side view of the device taken along lines 12—12 of FIG. 11.

Figure 3:
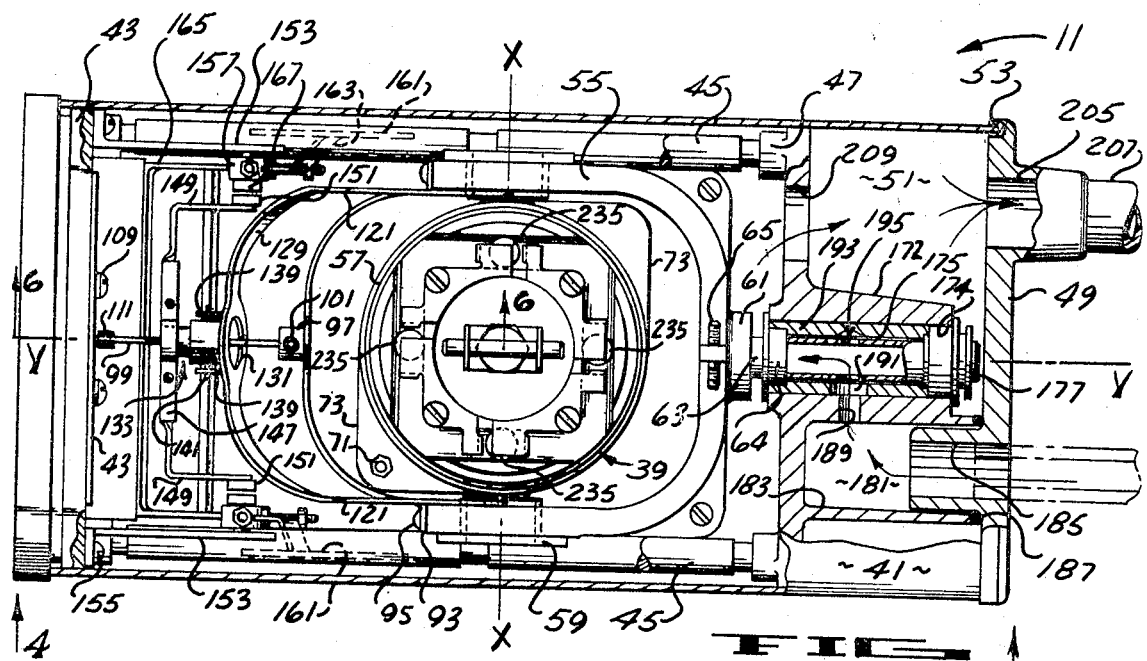
FIG. 3 is a partially sectioned top view of the device taken along lines 3—3 of FIG. 1.

Turning now to the drawings there is shown in FIGS. 1 and 2 the gyro indicator device 11 of the invention which has an outer casing 13 for housing the mechanism of the device. At the front of the device is a window 15 through which an airplane symbol 17 can be viewed. The airplane symbol 17 is pivotally connected at 19 to a shaft (not shown in this view). A dial face 21 is disposed on a front plate 16 of the device having markings 23 which correspond to the earth's horizon at a level position. As shown in FIG. 2, the symbol's wings 25 are parallel to the lines 23 when the airplane is flying completely parallel to the earth. Additional lines 27 are disposed around the mask equidistantly placed to indicate 30 degrees of roll between each line. As noted, dots 29 are provided to indicate 10 degrees of roll.

An indicator 31 may be provided on the face to notify the pilot when the electric power is not functioning. Disposed behind the airplane symbol 17 is a movable mask 32 having lines 33 thereon converging towards a point behind the airplane. The mask is provided with a slot 34 so it can move relative to symbol pivot point 19 in response to pitch of the aircraft, as described below. This movable mask is known as a terrain mask and serves to indicate the position of the airplane symbol 17 relative to the earth's terrain. The lines 33 are spaced so as to indicate distance perspective to the pilot. Behind the terrain mask 32 is a fixed mask 35 which may be colored blue and serves to depict the sky above the horizon lines 23. The terrain mask 32 can be for example black with lines 33 in white or blue. The airplane symbol 17 may be depicted in a contrasting color, such as white.

Figure 4:
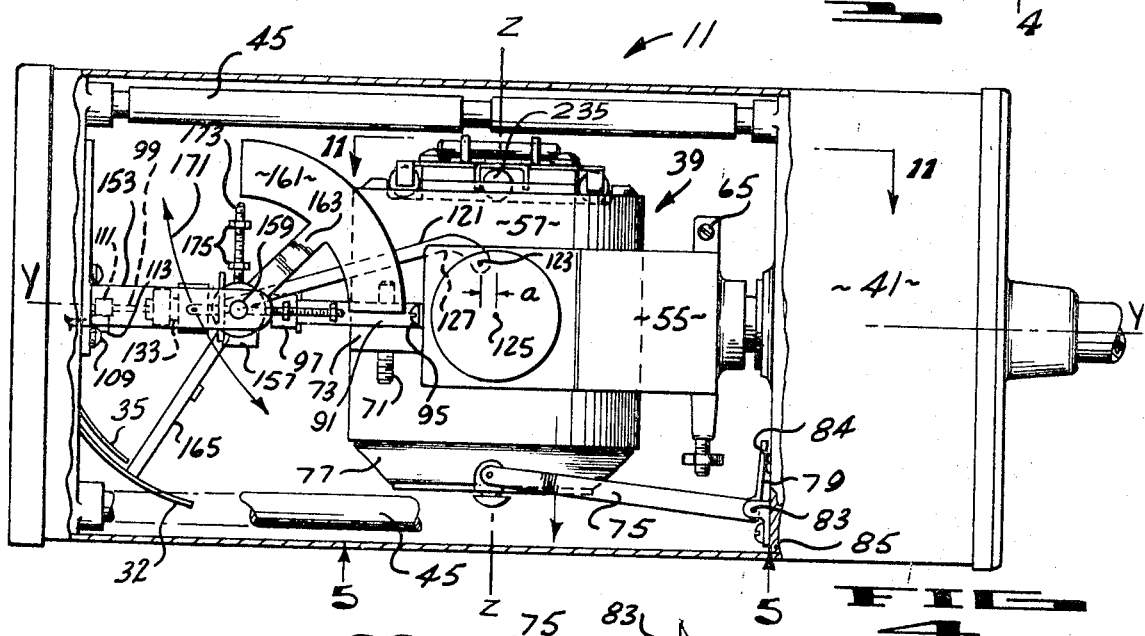
FIG. 4 is a partially sectioned side view of the device of the invention taken along lines 4—4 of FIG. 3.

Turning now to FIGS. 3 and 4, the mechanism for operating the device is shown. There is seen the outer casing or housing 13 which contains the gyro mechanism 39. As can be seen, the housing 13 is connected between a rear portion 41 and a front plate 43. Four support rods 45 are disposed in each corner of the rectangularly shaped housing within the casing 13 and connect the rear portion 41 to the front plate 43 serving to give rigid stability to the entire structure. The rods 45 extend from the front plate 43 to an intermediate support plate 47 which is disposed inwardly from the back plate 49 of the device forming a cavity 51 therebetween. The back plate 49 is separated from the intermediate plate 47 by the casing 13 which seats in a rubber gasket 53 within the back plate.

The gyro 39 is supported by a U-shaped outer gimbal 55. The gyro housing 57 is connected through bearings 59, as particularly shown in FIG. 11, to the arms of the outer gimbal 55 such that the outer gimbal can rotate relative to the gyro about the axis X—X, which is the axis normally parallel to the ground. In turn, the outer gimbal 55 has a protrusion 61 at the rear thereof which has been machined at 63 to serve as a shoulder for bearing 64. This allows the outer gimbal to rotate about axis Y—Y which is normal to axis X—X. An adjustable threaded bolt 65 may be provided adjacent the rear sleeve 61 normal to the Y—Y axis of the outer gimbal 55. This provides for a counterbalancing adjustment in the outer gimbal to assure its disposition about the Y—Y axis.

The housing 57 for the gyro, which is more commonly referred to as the inner gimbal, since it can move independently of the outer gimbal 55, is provided with flanges 73 for counter-balancing weights 71 which are threaded adjustable studs. These studs aid in the balancing of the gyro about the X—X axis.

Figure 5:
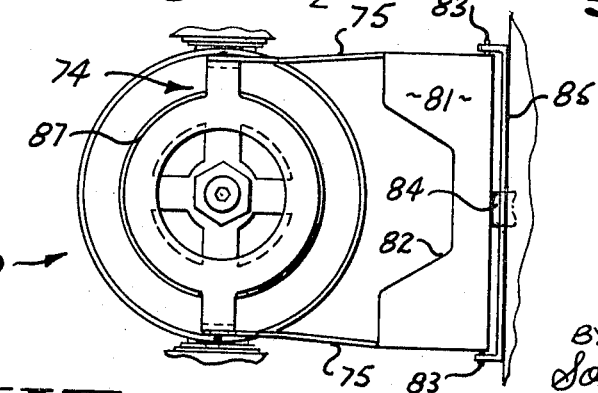
FIG. 5 is a bottom view of the gyro mechanism taken along lines 5—5 of FIG. 4.

With particular reference to FIGS. 4 and 5, means is shown for maintaining or caging the gyro in a relatively fixed position prior to its being actuated. This is accomplished by a support structure 74. The support structure 74 is comprised of two arms 75 extending from an L-section member 81 having a back portion 79 perpendicular to its base portion 82. Back portion 79 is connected to a conventional electromagnetic solenoid 84 disposed on the intermediate plate 47 of the device. The L-section member 81 is pivotally connected at 83 to the plate 47 through bracket 85. The arms 75 terminate and support an O-shaped ring 87, upon which the gyro can rest. When the solenoid 79 is activated, the arms 75 drop down away from the gyro in the direction of the arrow shown in FIG. 4, allowing the gyro to rotate freely.

To explain the mechanism for operating the airplane symbol indicator in the terrain mask, attention is directed to FIGS. 3, 4 and 6 particularly. Firstly, a description will be given as to how the airplane symbol is rotated as the airplane rolls. A yoke 91 is affixed to the front portions 93 of the outer gimbal 55 by screws 95. Affixed to the front of the yoke is a block 97, as particularly shown in FIG. 6, provided with an aperture for receiving axle 99 and a set screw 101 to maintain the axle 99 in the block 97 in a fixedly secured position. The axle 99 extends to the front of the device through aperture 103 in front plate 43. The axle 99 terminates just after passing through the plate 43, having a bearing 105 affixed to its end. The bearing is situated within a housing 107 which is secured by bolts 109 to the plate 43. On the side of the plate toward the yoke and adjacent to the plate a gear 111 is fixedly secured to the axle 99. Thus, due to the bearing 105 and the resultant freedom of movement of the end of the axle 99 at the front of the device, it can be seen that the outer casing 13 together with plate 43 and housing 107 can rotate freely relative to the gyro gimbals about the axle 99 and rear pivot 175 when the airplane rolls. Engaging the gear 111 is a gear 113. The gear 113 is affixed to an axle 115 which passes through the housing 107 and a sleeve bearing 117 disposed within the housing. At the end of the axle 115 opposite from the small gear 113 and in front of terrain mask 32, there is affixed an L-shaped fitting 119 which is connected to the airplane symbol 17. The fitting 119 serves when the aircraft is level to dispose the center of the symbol on an axis with the main axle 99 leading from the outer gimbal which in turn is the axis passing through the center of the gimbal.

To explain the operation of the airplane symbol 17, it is pointed out that the gear 113 which will revolve with the casing around the gear 111 has a diameter equal to that of the gear 111. As a result, any relative movement of the structure around the gear 111 will be reflected in twice that rotation in the airplane symbol relative to space. Thus, in operation when, for example, the aircraft rolls clockwise, the plate 43 will rotate clockwise together with the case 13 of the device. This in turn will cause a clockwise rotation of the housing 107 about the bearing 105 and the axle 99 attached thereto. Since the airplane symbol 17 is rotatably affixed to the housing 107 by the sleeve bearing 117, it will tend to move with the indicator device in a clockwise direction. The gear 111 remains angularly stationary in space and the gear 113 is forced to rotate or orbit about it. Since the gear ratio of gear 111 to the gear 113 is 1 to 1, then the airplane symbol 17 rotates about its axis equivalent to twice the rotation of the main aircraft itself. This is so because the bearing in housing 107 moves the symbol the same amount as the airplane itself plus the gear 113 forces the symbol to rotate an additional amount equivalent to the actual rotation of the airplane. If there were no gear on the end of the axle 115 the symbol would only move in direct accord with the casing 13 of the device and the terrain mask 32, not giving an indication of the actual roll.

Thus, if the aircraft rolls in a clockwise direction ten degrees, the airplane symbol 17 will rotate in a corresponding clockwise direction 20 degrees about its axis, which as indicated corresponds to the axis of the main axle 99 leading from the outer gimbal. The reason for this relative rotation will be seen from further description of the operation of the terrain mask 32 behind the symbol. Let it suffice at this point, however, to say that the terrain mask due to its attachment to the casing for pivoting about a pitch axis only will move with the aircraft and the outer casing 13 of the gyro indicator device in the roll direction in direct accord with the actual roll of the aircraft. Thus, since the terrain mask is moving, for example, 10 degrees in a clockwise direction when the aircraft itself rolls in a clockwise direction, it can be seen that without a greater movement of the airplane symbol 17 there would be no indication of the actual roll of the aircraft. However, since the airplane symbol 17 is rotating at twice the rotation of the aircraft itself, then the relative movement between the airplane symbol 17 and the terrain mask 32 will give a true indication of the actual roll of the aircraft. Thus it can be appreciated that the pilot of the aircraft will always be confronted with a horizon parallel to him, since he is tilting at the same degree together with the horizon mask when the aircraft rolls. However, the airplane symbol 17 will depict the actual roll of the aircraft he is piloting relative to the terrain mask. As a result there will be no confusion in the pilot's mind with regard to the actual relation of his aircraft to the terrain when a roll condition is encountered.

Turning now to a description of the operation of the terrain mask 32, reference is had to FIGS. 3, 4 and 6 particularly. Supporting arms 121 extend from opposite sides of the inner gimbal 57 and are pivotally secured to it at 123 by suitable means such as pins. The position of the pivot connection 123 for the arms 121 is above the center point 125 of the X—X axis passing through the gyro and forward a distance $a$ toward the front of the device. In other words, the connection of the arm is above and forward of the center point of the X—X or pitch axis. The support arms 121 are initially curved upward and forward from the pivot point 123 at 127, so as to clear the bearing 59 at the center of the gyro. The arms 121 terminate and are integrally formed with a yoke 129 which has an aperture 131 at its center where the yoke surrounds the axle 99. Disposed on axle 99 is a slidable bushing 133 which can traverse the axle 99. Disposed at the rear of the bushing is a bearing 135 held in place by clip fastener 137. The yoke 129 has two extensions 139 adjacent the aperture 131. The extensions 139 are pivotally connected by pins 141 to an outer race 143 of the bearing member 135. Thus, the yoke 129 can revolve together with the outer race 143 about the bushing 133 independent from any rotation movement of the bushing. Attached to the forward end of the bushing 133 by clip 145 is a bar 147. Arms 149 extend rearwardly toward the gyro mechanism from the bar 147 to form a generally U-shaped member together with the bar. At the end of the arms 149 are disposed permanent magnets 151 which are shown in enlarged detail in FIG. 7. Extending from the front of the casing rearward are support arms 153 which are secured to the front plate of the casing by bolts 155. Bushings 157 are mounted on pins 159 that extend inwardly from the support arms 153 the bushings and pins thus forming bearings for pivotally supporting members attached to the bushings. Silicone fluid (not shown) surrounds the pins 159 within the bushings to act as a damper. The details are well shown particularly in FIG. 7 where it can be seen that fixedly secured to the bushing 157 is a sheet metal counterweight 161. In a normal upright position, as shown in FIG. 4, the counterweight 161 is tilted by its attachment arm 163 backward and upwardly toward the gyro 39 from the front of the device. Extending downwardly in an opposite direction from counterweight 161 from the bushing 157 is a support arm 165 which is fixedly secured to the terrain mask 32. With their midpoints below the pin 159 as shown by FIG. 6, additionally mounted on the bushing are permanent magnets 167 which are of opposite polarity to magnets 151. Magnets 151 and 167 are slightly separated from one another by an air gap 169. The magnet arrangement serves as a coupling force between the means for actuating the terrain mask and the terrain mask element itself when movement occurs. This will prevent undue torque from being presented to the gyro when sudden movements occur.

Figure 7:
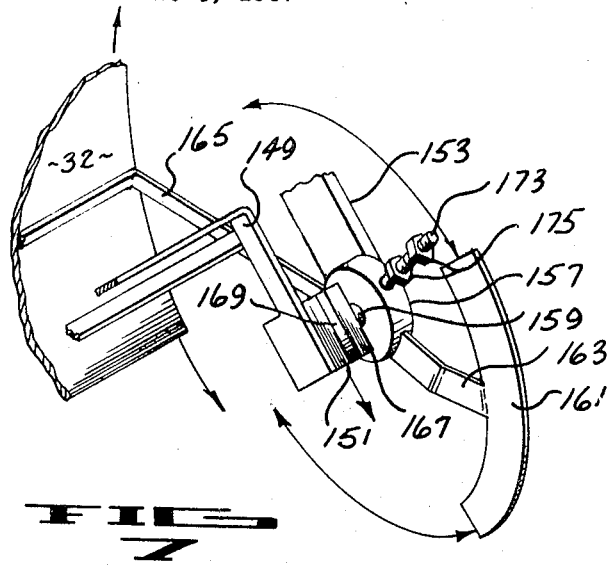
FIG. 7 is a pictorial representation of the magnetic coupler arrangement of the invention.
Figure 8:
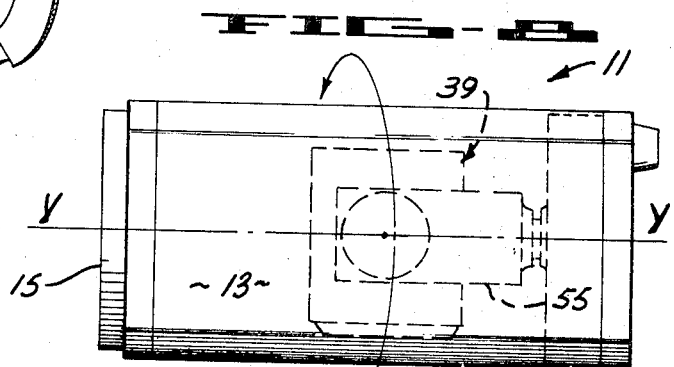
FIG. 8 is a pictorial representation of the device showing freedom of movement in a roll axis about the gyro mechanism.
Figure 9:
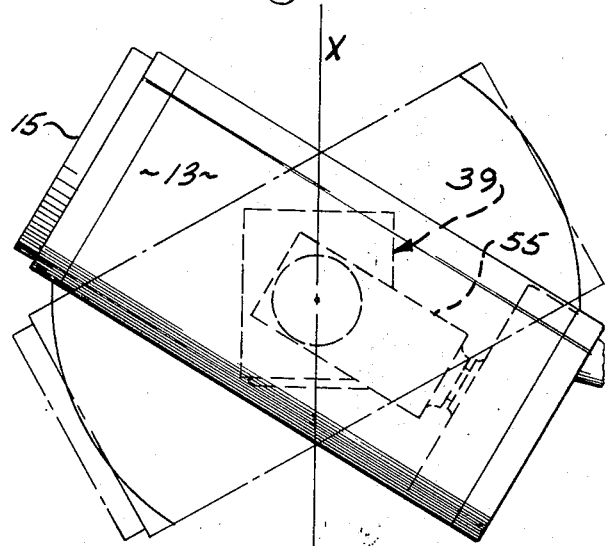
FIG. 9 is a pictorial representation of the device showing freedom of movement in the pitch axis about the gyro mechanism.

To explain the operation of the mechanism for moving the mask, attention should be directed to FIGS. 4, 6 and 7. It can be seen, for example, when the aircraft pitches in a downward direction or nose dive, the rear of the device will tilt downwardly together with the aircraft as seen particularly in FIG. 9, while the gyro 39 is maintained in an erect position since the outer gimbal can turn about the bearings 59 relative to the inner gimbal. As a result, the pivot point 123 where the arm 121 is affixed to the inner gimbal remains also in a fixed spacial position. However, axle 99 which is affixed to the outer gimbal will tilt upwardly toward the forward or viewing end of the casing in accord with the aircraft and housing of the device. This movement upwardly will force the bushing 133 to slide forwardly toward the front of the indicator along the axle 99. In so doing, the arm 121 as shown by line 171 rotates relative to the gyro 39 in a radius about point 123. It can be seen that as the arm 121 moves upwardly relative to gyro 39 on line 171, the bushing will approach the front of the device as it slides along the axle. In so doing, magnets 151 are additionally moved forward together with the bushing. They in turn force magnets 167 in a forward direction, forcing the terrain mask support arm 165 to rotate upwardly with its bushing 157. As particularly shown in FIG. 7, a forward movement of arm 149 holding magnet 151 causes the rotation of the bushing 157 about the point 159 due to the magnet 167 being off-center with a moment of force in a clockwise direction when the arm 149 moves forward toward the front of the device. As explained and as can be seen, the forward movement with the moment of force in a clockwise direction will force the terrain mask upwardly in accord with the downward movement of the aircraft. As a result, as can be seen looking at FIG. 2, the terrain mask will rise above the airplane symbol 17 to give an indication of the downward direction below the horizon of the aircraft as it pitches downward. Likewise, when the airplane is pitching in an upward direction, the bushing 133 will move as indicated by line 171 downwardly toward the gyro 39 away from the front of the indicator. In so doing, it of course forces magnet 151 rearwardly away from the indicator face causing, as can be seen in FIG. 7, a counterclockwise movement of the bushing 157 pulling the terrain mask 32 downwardly. By pulling the mask downwardly more of the blue colored horizon of the fixed mask 35 will be seen both above and below the airplane symbol 17.

Extending upwardly from bushing 157 is a threaded stud 173, having nuts 175 thereon. This serves as a means for precisely balancing the mask in a position as shown in FIG. 2. Adjustment is accomplished by moving the nuts 175 on the stud member 173. As can now be appreciated, the magnetic coupling achieved is a quite valuable contribution to the gyro indicator device. As the airplane encounters a condition of sudden pitch, the torque that would be encountered in forcing the terrain mask upwardly through a direct cam and linkage system would be fed back to the gyro mechanism, causing a significant precession. However, the frictional results of conditions of pitch are considerably reduced by the magnetic coupling involved, so that there will not be a great feedback in the system to the gyro.

To explain the novel features of the indicator device of this invention relating to the electro-pneumatic operation and the precise control for precession effects, attention is directed particularly to FIGS. 11, 12 and 3. Plate 47 toward the rear of the device has a rearwardly extending boss 172 about the center axis Y—Y of the device. The inner walls 174 of boss 172 are machined to a circular cross-section to have disposed therein a bearing 64 and outer gimbal pivot 175 which is part of the outer gimbal. At the rear of the boss, a fastener 177 holds the bearing in place within the boss 172. A portion of the boss 172 is formed to have a chamber 181 of circular cross-section which receives an inwardly extending neck portion 185 from the rear plate 49. An O-ring seal 187 surrounds the neck 185 where the rear plate 49 meets the boss 172. An aperture 189 is drilled in boss 172 and communicates between chamber 181 and an aperture 191 in a bearing seal 193. Situated within the bearing seal 193 is the gimbal pivot 175 provided with a plurality of apertures 195 corresponding to the aperture 191 in the bearing seal 193. The one arm 196 has a passage 198 formed therein, while the other arm 197 of the gimbal is of solid construction. The passage 198 leads to the bearing 59 on the housing 57 of the inner gimbal or gyro 39. The sleeve portion 199 of the housing 57 which is seated within bearing 59 is provided with a center aperture 201 which communicates with a tangentially disposed hole 203 in the wall so that air, as shown by the arrows, in entering from line 200 is directed tangentially into the housing 57.

Between plates 47 and 49 there is formed an upper chamber 51 which communicates with an opening 205 in the back plate 49, to which is connected a vacuum line 207 of the aircraft. An additional opening 209 is provided in plate 47 to communicate with the area 51.

Sealed off by the O-ring seals 187 from the space 51 is a second area 181. Thus, when a vacuum is pulled in line 207 all the air within the indicator device is pulled out through aperture 209 into the vacuum line 207, sucking new air in through sleeve 185 into opening 181, then through the groove 198 into the gyro housing 57, as shown by the path of the arrows in FIG. 6 particularly.

Mounted on arm 197 at fitting 205 is an insulator block 210, which secures brushes or wipers 212 in contact with lead 214 to electric power source of the aircraft. Wipers 212 are in contact with slip ring 213 which extends through bearing 59. A second lead line 219 is connected to the slip ring 213 adjacent the housing 57. The conductive electrical lead line 219 is directed to a rotor shaft 221 on which is mounted a motor 223 such as a synchronous hysteresis type, shown in phantom in FIG. 12. Mounted on rotor shaft 221 through bearings (not shown) is a rotor 225 which can be driven by the motor 223. The rotor serves as the gyro rotary element to give the gyroscopic effect. Rotor 225 has a plurality of buckets 227 machined thereon about its center portion. Below the rotor buckets 227 is located a plurality of centrifugal fan blades 229 which rotate together with the buckets.

Figure 10:
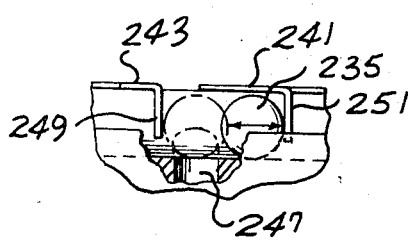
FIG. 10 is taken along line 10—10 of FIG. 6.

The gyro housing 57 is provided with a top plate 231 which has formed therein a rectangularly shaped channel 233 in which can roll four balls 235. Affixed on top of plate 231 is a cover sheet 237 which is secured to plate 231 by screws 239. Sheet 237 is actually comprised of four individual sections, as can be seen particularly in the top view as shown in FIG. 11. The top segments 237 of sheet metal construction are provided with tab portions 241 and 243 which serve to extend over and cover the groove 233 adjacent the balls 235. As can be seen particularly in the view in FIG. 10, the tab portion 243 is curved downwardly adjacent the inner section of aperture 247 which communicates between the inside of the gyro and the ball 235. As can be seen, the tab portion 243 due to its downwardly curved portion 249 causes the ball as shown in phantom to rest completely blocking the aperture 247 when the ball is caused to traverse in a direction toward tab portion 243. Alternatively, the tab portion 241 allows the ball to move away from the opening 247 completely exposing the aperture and limits its travel with a downwardly extending portion 251. Thus the ball is free to rotate from a position adjacent the downward portion 249 of tab 243 and completely blocking the hole to a position adjacent downwardly extending portion 251 wherein the aperture 247 is completely exposed. The angle of the aperture 247 is shown as preferably being 45 degrees to achieve a maximum result in the operation of the device, as will be explained. However, the hole 247 can be even vertically directed to the ball 235 and achieve satisfactory results. The bottom plate 253 of the gyro has a plurality of apertures 255 therein, four shown by way of example, radially disposed about the center axis of the gyro. Within the gyro housing and covering the apertures 255 is a flapper valve 257 which is secured by fastener 259 to support unit 261 in which rotor shaft 221 is supported at the bottom of the device. The flapper valve 257 can be constructed of reed or thin spring metal.

Additionally mounted on the top plate 231 are two supports 263 disposed on the Y—Y axis on either side of the rotor shaft 221. Connected between the supports 263 is a threaded stud 265 which serves as a means to balance the inner gimbal about the X—X axis.

It can be seen from FIG. 11 particularly that the apertures 247 leading from the inside of the gyro casing to the balls 235 are disposed off the center of the axis X—X and Y—Y such that the apertures disposed, for example, adjacent the Y—Y axis are on opposite sides of the axis, and the two apertures about the X—X axis likewise are on opposite sides of the axis. To explain the erection procedure for the gyro utilizing the four balls, attention is first directed to operation of the device pneumatically. The air as shown by the arrows entering through port 203 causes rotation of the rotor buckets 227. The pressure within the housing of the gyro and the vacuum outside of it causes a pressure differential so that the flapper valve 257 is forced to a closed position. The air thus exhausts through the ports 247. When, for example, the gyro is caused to tilt about the Y—Y axis it can be seen that one of the apertures 247 will be completely closed by the ball as it rolls along the groove 233, while the opposite aperture on the Y—Y axis is now fully exposed to the outside environment. The open port produces a thrust from the escaping air that is in the proper direction to cause a precession of the gimbal system opposite of the initial tilt. In the electric mode, the motor 223 drives the fan blades 229. The flapper valve automatically opens when the pressure in the intake of the fan blades is reduced as the fan spins up. The air shown by the arrows is taken through the ports 255 into the gyro housing and subsequently ejected in the manner previously described through the ports 247 in the top plate.

I claim:
1. An attitude indicator device comprising:
   an outer casing,
   a gyro disposed in said casing,
   a housing for said gyro comprising an inner gimbal for said gyro,
   a yoke surrounding and pivotally connected to said inner gimbal at an axis normal to the vertical axis of said gyro, said yoke additionally pivotally connected to said casing,
   an indicator symbol,
   a terrain mask,
   means for operatively connecting said indicator symbol to said yoke including an axle rigidly affixed at one end thereof to said yoke, a first gear affixed to the opposite end of said axle and a second gear affixed to said symbol, said second gear engaging said first gear,
   bearing means fixedly attached to said casing for pivotally supporting said symbol on said casing for rotation about a first axis,
   means for operatively connecting said terrain mask from behind said symbol to the gyro housing, and
   means for pivotally supporting said terrain mask on said casing for rotation about a second axis normal to said first axis,
   said connecting means and said supporting means including two arms pivotally connected at one end thereof to opposite sides of said housing adjacent the juncture of said yoke with the housing, a slidable bushing mounted on said axle, the other ends of said arms connected to said slidable bushing, and means connecting said slidable bushing to said terrain mask comprising two bearings fixedly connected to opposite sides of said casing, magnets pivotally mounted on said bearings, arms extending from said bushing toward each bearing, magnets disposed on the ends of said arms adjacent the magnets on said bearings and rigid support means connecting said mask to the magnets on said bearings.

References Cited

UNITED STATES PATENTS

| | | |
|---|---|---|
| 2,036,229 | 4/1936 | Moss. |
| 2,038,531 | 4/1936 | Bassett et al. |
| 2,207,414 | 7/1940 | Rodanet. |
| 2,207,717 | 7/1940 | Carter. |
| 2,300,404 | 11/1942 | Carter et al. |
| 2,489,294 | 11/1949 | Kenyon. |
| 3,208,426 | 9/1965 | Coffing. |

FOREIGN PATENTS

| | | |
|---|---|---|
| 1,205,406 | 8/1959 | France. |
| 877,780 | 9/1942 | France. |
| 941,569 | 7/1948 | France. |

ROBERT B. HULL, Primary Examiner

U.S. Cl. X.R.

74—5.43